Patented June 16, 1931

1,810,803

UNITED STATES PATENT OFFICE

HENRY ULRICH, OF MEXICO, MEXICO

PROCESS FOR DESULPHURIZING LIQUID PETROLEUM HYDROCARBONS OR LIGHT DISTILLATES

No Drawing. Application filed May 29, 1930, Serial No. 457,544, and in Mexico March 14, 1930.

My invention relates to processes for refining and desulphurizing petroleum oil distillates, more particularly to processes for refining and desulphurizing petroleum oil distillates derived from an asphaltic or mixed base crude petroleum oil, such, for example, as Mexican, Texas and California oils.

The processes now in use for the refining and desulphurizing of petroleum oils require the use of large amounts of concentrated or fuming sulphuric acid as well as the heating of the distillate to high temperatures to carry out the reactions. In the most commonly used method of desulphurizing petroleum distillates, such as gasolene or kerosene, a distillate is treated, first with a solution of sodium plumbate and then with small amounts, for example, 2% to 5% of concentrated sulphuric acid. Certain of the sulphur compounds are removed by this treatment, but very large amounts of highly concentrated or fuming sulphuric acid are required to reduce the sulphur contents of the distillates to an amount of say 0.02%. The use of large quantities of sulphuric acid is, needless to say, an expensive undertaking.

In some methods for desulphurizing petroleum distillates such, for example, as the Frasch process, wherein copper oxide is used to decompose the sulphur compounds, valuable chemicals in form of solids handling of which is technically always troublesome, must be utilized to eliminate the sulphur. These processes also require heating to high temperatures. For these reasons these are also expensive methods of reducing the sulphur content of petroleum distillates. It is, therefore, a primary object of my invention to provide a process for the treatment of petroleum distillates for the desulphurization thereof that does not utilize minerals, or solids such as copper oxide compounds in the desulphurization process and which on the contrary carries out said process with a simple equipment, requiring only a small invested capital, at a low temperature, preserving thereby all components to the utmost at the same time reducing the cost of operation and maintenance of the apparatus employed.

A further object of my invention is to provide a process for the treatment of gasolene or other motor-spirit fractions that will reduce the same to a distillate having a low sulphur content and leave the treated distillate with a pleasant, agreeable and sweet odour.

Other objects and advantages of my process will appear as the specification proceeds and the invention will be more particularly defined in the appended claims.

The process consists in taking the crude distillate or spirit of a specific gravity, for example, of 0.725 and treating the same with a solution of plumbate of sodium which may be formed in any suitable manner, for example, by dissolving litharge to saturation in caustic soda lye. The treated distillate is then washed with water and when dry, agitated for a suitable period of time, usually about fifteen minutes with a small amount, 2% or 3% by weight usually sufficing, of concentrated sulphuric acid. The acid sludge is then allowed to settle and the treated spirit washed neutral with any suitable alkaline solution.

I then chill this dry neutral product by any suitable means until the same attains a temperature below zero degrees Fahrenheit.

Dry diluted normal ozone or oxozone or ozonized air is then brought into contact with the solution by means of any suitable operation such as spraying. This operation oxidizes the sulphur compounds, breaking them up and forming a white, gelatinous precipitate which is rich in sulphur and which may be removed by filtration or any other convenient means.

After this removal of this precipitate with its large sulphur content, the remaining filtrate may be agitated with concentrated caustic lye or sulphuric acid for a sufficiently long period of time to remove all the sulphur compounds, which have been oxidized or acted upon by the ozone, from the spirit by dissolving said compounds in the caustic lye or acid, whichever is used.

The distillate is then washed neutral by any suitable alkaline solution and is ready for use with the sulphur content reduced to a minimum.

It will be found that a spirit treated in this manner has the lowest possible sulphur content obtainable under present desulphurization methods and has a sweet and pleasant odour.

The amount of sulphur left in the distillate or spirit and the quality of the product produced depends upon the concentration of the ozone employed, the specific nature of the crude spirit, the consequent re-action temperature between the ozone and the spirit and, of course, the time of reaction between the compounds of the distillate and the ozone.

In the case of oils or residues which are to be desulphurized but which cannot be contacted with normal ozone, or oxozone, or ozonized on account of their consistency at low temperatures, it is necessary to dissolve these products, as the first step in the process, in any suitable inert solvent.

It is thus seen that I have provided a process for the refining and desulphurizing of petroleum distillates which utilizes diluted ozone that is to say, a gas, an inexpensive and technically speaking a most flexible oxidizing agent which carries out the desulphurizing process at a low temperature, thereby doing away with the necessity of large heating systems and consequently decreasing the cost of this operation and achieving the result with greater simplicity.

What I claim is:—

1. A process for desulphurizing liquid petroleum hydrocarbons or light distillates, which consists in contacting the said liquids in a dry state at temperatures below zero degrees Fahrenheit with dry ozonized air for the formation of new sulphur compounds, and removing said compounds.

2. A process for desulphurizing liquid petroleum hydrocarbons or light distillates, which consists in contacting the said liquids in a dry state at temperatures below zero degrees Fahrenheit with dry ozonized air or oxygen to form a precipitate of sulphur compounds and removing said precipitate by filtration.

3. A process for desulphurizing liquid petroleum hydrocarbons or light distillates, which consists in treating the said liquids in a dry state at temperatures below zero degrees Fahrenheit with dry oxidized oxygen to form sulphur compounds and dissolving said compounds with caustic lye.

4. A process for desulphurizing liquid petroleum hydrocarbons or light distillates which consists in contacting the said liquids in a dry state at temperatures below zero degrees Fahrenheit with dry oxidized oxygen to form sulphur compounds and dissolving said compounds with acids.

5. A process for desulphurizing liquid petroleum hydrocarbons or light distillates which consists in treating said liquids with a solution plumbate of sodium, washing and drying the mixture, agitating it with concentrated sulphuric acid, treating with an alkaline solution, chilling of the mixture, applying ozone for the formation of sulphur compounds, and removing said sulphur compounds.

6. A process of desulphurizing liquid petroleum hydrocarbons or light distillates consisting in treating the liquid with plumbate of sodium, washing the liquid, agitating the liquid with sulphuric acid, neutralizing the resulting mixture, treating said mixture with ozone for the formation of new sulphur compounds, and removing said sulphur compounds.

HENRY ULRICH.